United States Patent [19]

McDaniel

[11] 4,190,457
[45] Feb. 26, 1980

[54] PREPARATION OF INORGANIC XEROGELS

[75] Inventor: Max P. McDaniel, Bartlesville, Okla.

[73] Assignee: Phillips Petroleum Co., Bartlesville, Okla.

[21] Appl. No.: 914,258

[22] Filed: Jun. 9, 1978

[51] Int. Cl.² ............................................. C01B 33/16
[52] U.S. Cl. ..................................... 106/122; 252/451; 423/338
[58] Field of Search ........................ 106/122; 423/338; 252/451; 428/405

[56] References Cited

U.S. PATENT DOCUMENTS

| 2,503,913 | 4/1950 | Kimberlin | 34/9 |
| 3,225,023 | 12/1965 | Hogan et al. | 260/94.9 |
| 3,652,215 | 3/1972 | Aboutboul | 423/338 |
| 3,862,104 | 1/1975 | Witt | 423/338 |
| 3,887,494 | 6/1975 | Dietz | 252/452 |
| 3,948,806 | 4/1976 | Witt | 423/338 |
| 3,969,308 | 7/1976 | Penneck | 260/37 SB |
| 3,975,293 | 8/1976 | LePage | 423/338 |
| 4,014,816 | 3/1977 | Hogan et al. | 252/430 |
| 4,053,565 | 10/1977 | Krekeler | 423/338 |

OTHER PUBLICATIONS

Chem. Abst. 84:112,169c, 1976.
Chem. Abst. 84:80209x, 1976.

Primary Examiner—Theodore Morris

[57] ABSTRACT

An inorganic xerogel is produced by contacting an inorganic hydrogel with a contacting system which comprises at least one organosilicon compound and thereafter heating the resulting hydrogel to remove essentially all the liquid components therein.

31 Claims, No Drawings

PREPARATION OF INORGANIC XEROGELS

BACKGROUND OF THE INVENTION

This invention relates to the preparation of inorganic xerogels.

Inorganic gels are well known and have long been used for various purposes, for example, for the adsorption of condensible vapors from gaseous carriers and for catalytic purposes either as a catalyst itself or as a component thereof or as a carrier. The most widely used of these inorganic gels in the dried condition is that of silica with or without the addition of other gelatinous materials such as alumina.

Inorganic gels in combination with various compounds, such as a chromium compound for example, have been found to be particularly useful as catalysts for carrying out reactions involving hydrocarbons, especially olefins such as ethylene, as disclosed in Dietz U.S. Pat. No. 3,887,494 (1975). It is known that the melt index and thus the molecular weight of an olefin polymer generally is responsive to the average pore diameter of the catalyst support. By increasing the average pore diameter of the catalyst support, therefore, there is achieved an increase in the melt index of the polymer prepared in the presence of a catalyst containing such support.

The manner in which a catalyst or support to be utilized in a catalytic composition is prepared can influence the average pore diameter of the support, and hence the melt index of the polymer prepared in the presence of the catalyst composition. Methods of preparing catalysts and inorganic hydrogels used in preparing catalyst compositions are well known in the art, such as those disclosed in Dietz U.S. Pat. No. 3,887,494 (1975) and Kimberlin et al U.S. Pat. No. 2,503,913 (1950).

In the preparation of an inorganic catalyst support (xerogel) from a hydrogel, e.g., a silica-containing hydrogel, an important step is the removal of water from the hydrogel or the drying of the hydrogel to produce the xerogel. The step is important in that the manner in which the water is removed has a great bearing upon the size of the pores of the catalyst support (xerogel). One method of drying hydrogel is to heat the hydrogel at a high temperature in order to evaporate the water. A problem, however, is that the dried hydrogel (xerogel) has relatively small pores.

The prior art has somewhat overcome this problem by removing the water from the hydrogel through repeated washings with an organic compound or by azeotropic distillation. The organic compounds utilized are usually aliphatic monohydric alcohols or ketones, as disclosed in Kearby U.S. Pat. No. 2,429,319 (1947), Kimberlin et al U.S. Pat. No. 2,503,913 (1950) and Wetzel et al U.S. Pat. No. 2,978,298 (1961). Use of these organic compounds requires many time-consuming steps to recover a dried gel. Azeotropic distillation involves not only additional processing but also additional expense.

An object of the present invention, therefore, is to provide a simple process to produce an improved inorganic xerogel.

Other objects, aspects and the several advantages of this invention will be apparent to those skilled in the art upon a study of this disclosure and the appended claims.

SUMMARY OF THE INVENTION

In accordance with the present invention, an inorganic xerogel is prepared by contacting an inorganic hydrogel with a contacting system which comprises at least one organosilicon compound and heating the treated inorganic hydrogel at an elevated temperature so that essentially all the liquid components contained therein are removed.

DETAILED DESCRIPTION OF THE INVENTION

Surprisingly it has been discovered that pore collapse of hydrogels is retarded during drying by the presence of organosilicon compounds. Moreover, this invention provides a simple, inexpensive process for the preparation of dried hydrogels as compared to the costly azeotropic process.

The contacting system of the present invention comprises at least one organosilicon compound having the structure $$R_nSiA_{4-n}$$

wherein n is an integer of 2 or 3, and wherein each R is a saturated or unsaturated hydrocarbon group wherein each R can be the same or different and wherein A is selected from the group consisting of hydroxy radicals, halides and alkoxy radicals in which the alkyl group therein contains from 1 to about 10 carbon atoms.

Preferably, R is selected from the group consisting of alkyl radicals of from 4 to about 12 carbon atoms, alicyclic radicals of from 4 to about 12 carbon atoms, aryl radicals of from 6 to about 24 carbon atoms, and hydrocarbyl-substituted aryl radicals such as alkylaryl and cycloalkylaryl of from 6 to about 24 carbon atoms.

Some examples of suitable organosilicon compounds which can be employed in the instant invention include tri-t-butylsilanol, tri-t-octylsilanol, tricyclohexylsilanol, triphenylsilanol, tribenzylsilanol, tri-1-naphthylsilanol, tri-4-phenanthrylsilanol, tri-o-tolylsilanol, tri-p-cumenylsilanol, tris(4-pentyl-1-naphthyl)silanol, tris(10-decyl-9-anthryl)silanol, tris(3-cycloheptylphenyl)silanol, tris(7-phenyl-1-naphthyl)silanol, diphenylsilanediol, di-1-naphthylsilanediol, dicyclododecylsilanediol, di-t-octylsilanediol, triphenylchlorosilane, tri-1-naphthylbromosilane, dicyclohexyldichlorosilane, diphenyldiethoxysilane, phenylcyclohexylsilanediol and diphenyl-t-butylchlorosilane.

The presently preferred organosilicon compounds are triphenylsilanol, diphenylsilanediol and triphenylchlorosilane because of ready availability and relatively low cost and because they have been used with good results.

The amount of organosilicon compound used can be selected over a wide range. In functional terms the amount of the at least one organosilicon compound employed in the contacting step is an amount sufficient to provide an increase in pore volume of the contacted and heated inorganic hydrogel as compared to the pore volume of the heated inorganic hydrogel not contacted with the organosilicon compound. Generally, the amount of the organosilicon compound is selected within the range from about 0.1 to about 20 weight percent of the hydrogel employed, more preferably from about 1 to about 10 weight percent for reasons of economy.

In another embodiment of this invention, the contacting system can also additionally have at least one water-soluble oxygen-containing organic liquid.

Suitable water-soluble oxygen-containing organic liquids which may be used are alcohols, such as methanol, ethanol, propanol, isopropanol, tertiary butanol, ketones, such as acetone, methyl ethyl ketone, di-ethyl ketone and ethers such as 1,4-dioxane.

When an organosilicon compound and a water-soluble oxygen-containing organic liquid are employed, the weight ratio can vary widely. Generally, the weight ratio of water-soluble oxygen-containing organic liquid to organosilicon compound employed is in the range from about 100:1 to about 0.5:1, preferably from about 20:1 to about 1:1.

The hydrogels contemplated in this invention are generally the inorganic gels formed from the precipitation of the oxides of aluminum, germanium, iron, molybdenum, silicon, tin, titanium, tungsten, vanadium, zirconium and combinations of any two or more thereof.

Presently preferred is the hydrogel comprising silica because of its wide use in industry and good performance in accordance with the present invention.

Inorganic hydrogels can be prepared by employing any of the well known techniques of the prior art, e.g., such as that disclosed in Dietz U.S. Pat. No. 3,887,494 (1975).

The time necessary for contacting the hydrogel is not believed to be critical. Normally the time employed is the amount of time sufficient to obtain penetration of the organosilicon compound into the pores of the gel which is generally less than one minute, but most any length of time can be used. Long contacting times also can be used without impaired results. Thus a contacting time within a range of about 30 seconds to about 10 hours or more can be used.

The hydrogel composition is treated at an elevated temperature by any suitable means such that essentially all liquid components contained therein are removed. Generally this can be achieved by the application of sufficient heat. Frequently the hydrogel composition which has been contacted with an organosilicon compound and a water-soluble oxygen-containing organic liquid is heated in vacuo or in air, e.g. in an oven or with a heat lamp. Preferably, the temperature used in the treating step is within the range of about 20° to about 300° C. A temperature of about 150° C. has been used with good results.

The inorganic xerogels obtained in accordance with this invention have a pore volume of at least 1.75 cubic centimeters (c.c.). Inorganic xerogels have been produced that have pore volumes within the range of about 1.75 to about 2.20 c.c. As used in the specification and claims the pore volume defined herein is the pore volume determined by the Innes method as described in *Analytical Chemistry* 28, 332–334 (1956) and represents the number of cubic centimeters of isopropanol adsorbed per gram of calcined xerogel.

The inorganic xerogel, which is produced when the liquid components are removed from the hydrogel composition by the process of the present invention, can then be used as a catalyst support in the olefin polymerization processes known in the art.

A better understanding of the invention will be obtained upon reference to the following illustrative examples which are not intended, however, to be unduly limiting of the invention.

EXAMPLE I

A 50-gram sample of a commercially available silica hydrogel, containing about 20 weight percent (wt. %) solids and about 0.1 wt. % sodium (Na+), was added individually to a series of containers. A specified amount of an organosilicon compound in 60 ml of isopropanol was added to each container as shown in the table below except for runs 1 and 2. In run 1, no isopropanol or organosilicon compound was added to the silica hydrogel; in run 2, only isopropanol was added to the silica hydrogel. The contents in each container were stirred by hand for one minute. Each container was placed overnight in a vacuum oven maintained at 150° C. (302° F.) and 0.5 atmosphere. The dried products were ground and each sample sieved. The 50-mesh or finer fraction of each sample was then calcined overnight in an air oven at a temperature of 538° C. (1000° F.) and then cooled. The pore volume of a specimen was determined via the Innes method, as described in *Analytical Chemistry* 28, 332–334 (1956). Pore volume measurements represent the number of cubic centimeters (cc) isopropanol adsorbed per grams of calcined xerogel. The pore volume values in cc determined by the Innes method provides a relative indication of pore volume in each of the xerogel samples tested.

The nature of quantity of the organosilicon compounds employed and the pore volumes of the calcined xerogels are presented in the Table below.

| Run No. | Organosilicon Compound Description | Amount wt. % | Pore Volume, cc. |
|---|---|---|---|
| 1 | Control, no isopropanol | — | 1.46 |
| 2 | Control, 60 ml isopropanol | — | 1.74 |
| 3 | Triphenylsilanol | 1 | 1.92 |
| 4 | Triphenylsilanol | 8 | 1.83 |
| 5 | Diphenylsilanediol | 4 | 1.78 |
| 6 | Triphenylchlorosilane | 4 | 1.90 |
| 7 | Triethylsilanol (control) | 1.2 | 1.48 |
| 8 | Triphenylsilanol | 4 | 2.19 |
| 9 | Triphenylsilanol | 4 | 1.92 |
| 10 | Triphenylsilanol | 4 | 1.86 |

The results presented in the table demonstrate the effect of the various organosilicon compounds on the pore volume of each calcined xerogel. In control run 1, where no isopropanol or organosilicon compound is employed, the silica zerogel has a pore volume of 1.46 cc. In control run 2, when isopropanol is employed as the sole additive to the hydrogel during drying, a pore volume of 1.74 cc results. However, invention runs 3–6 and 8–10 clearly demonstrate a pore volume noticeably greater than that of control run 1 as well as control run 2 which used isopropanol alone.

Moreover, control run 7 demonstrates that the silanols require bulky hydrocarbyl radicals in order to achieve results that are similar to those obtained with triphenylsilanol.

Based on the pore volume results at the same additive level the data shown in runs 6 and 8–10 clearly show that triphenylsilanol and triphenylchlorosilane are about equivalent in performance. Furthermore, the pore volume of run 5 shows that silica hydrogels can be dried in the presence of silanediols of the nature previously disclosed with good results.

Reasonable variations and modifications, which will become apparent to those skilled in the art, can be made in the invention without departing from the spirit and scope thereof.

I claim:

1. A process for preparing an inorganic xerogel which comprises contacting an inorganic hydrogel with a contacting system which comprises at least one organosilicon compound of the formula $$R_nSiA_{4-n}$$

wherein n is an integer of 2 or 3, wherein each R is a saturated or unsaturated hydrocarbon group and each R can be the same or different and wherein A is selected from the group consisting of hydroxy radicals, halides, and alkoxy radicals in which the alkyl group therein contains from 1 to about 10 carbon atoms; and, heating the thus contacted inorganic hydrogel at an elevated temperature such that essentially all the liquid components contained therein are removed, wherein the amount of the at least one organosilicon compound employed in the contacting step is an amount sufficient to provide an increase in pore volume of the contacted and heated inorganic hydrogel as compared to the pore volume of the heated inorganic hydrogel not contacted with the organosilicon compound.

2. A process according to claim 1 wherein R is selected from the group consisting of alkyl radicals of from 4 to about 12 carbon atoms, alicyclic radicals of from 4 to about 12 carbon atoms, aryl radicals of from 6 to about 24 carbon atoms, and hydrocarbyl-substituted aryl radicals such as alkylaryl and cycloalkylaryl of from 6 to about 24 carbon atoms.

3. A process according to claim 1 wherein said inorganic hydrogel is a hydrogel comprising silica.

4. A process according to claim 1 wherein said organosilicon compound is selected from the group consisting of tri-t-butylsilanol, tri-t-octylsilanol, tricyclohexylsilanol, triphenylsilanol, tribenzylsilanol, tri-1-naphthylsilanol, tri-4-phenanthrylsilanol, tri-o-tolylsilanol, tri-p-cumenylsilanol, tris(4-pentyl-1-naphthyl)silanol, tris(10-decyl-9-anthryl)silanol, tris(3-cycloheptylphenyl)silanol, tris(7-phenyl-1-naphthyl)silanol, diphenylsilanediol, di-1-naphthylsilanediol, dicyclododecylsilanediol, di-t-octylsilanediol, triphenylchlorosilane, tri-1-naphthylbromosilane, dicyclohexyldichlorosilane, diphenyldiethoxysilane, phenylcyclohexylsilanediol and diphenyl-t-butylchlorosilane.

5. A process according to claim 1 wherein the said organosilicon compound is triphenylsilanol.

6. A process according to claim 1 wherein the said organosilicon compound is diphenylsilanediol.

7. A process according to claim 1 wherein the said organosilicon compound is triphenylchlorosilane.

8. A process according to claim 1 wherein said organosilicon compound is employed in the range of from about 0.1 to about 20 weight percent of the hydrogel employed.

9. A process according to claim 1 wherein said organosilicon compound is employed in the range of from about 1 to about 10 weight percent of the hydrogel employed.

10. A process according to claim 1 wherein said resulting hydrogel composition is heated to a temperature within the range of about 20° to about 300° C.

11. A process according to claim 1 wherein there is additionally present in the said contacting system at least one water-soluble oxygen-containing organic liquid.

12. A process according to claim 11 wherein the said water-soluble oxygen-containing organic liquid is selected from the group consisting of methanol, ethanol, propanol, isopropanol, tertiary butanol, acetone, methyl ethyl ketone, di-ethyl ketone and 1,4-dioxane.

13. A process according to claim 12 wherein the weight ratio of said water-soluble oxygen-containing organic liquid to the organosilicon compound is in the range from about 100:1 to about 0.5:1.

14. A process according to claim 13 wherein the weight ratio of said water-soluble oxygen-containing organic liquid to the organosilicon compound is in the range from about 20:1 to about 1:1.

15. A process according to claim 1 wherein said inorganic xerogel has a pore volume of at least 1.75 cc.

16. A process according to claim 1 wherein said inorganic xerogel has a pore volume within a range of about 1.75 to about 2.20 cc.

17. A process for preparing an inorganic xerogel which comprises contacting an inorganic hydrogel with a contacting system which comprises at least one organosilicon compound of the formula $$R_nSiA_{4-n}$$

wherein n is an integer of 2 or 3, wherein each R is a saturated or unsaturated hydrocarbon group and each R can be the same or different and wherein A is selected from the group consisting of hydroxy radicals, halides, and alkoxy radicals in which the alkyl group therein contains from 1 to about 10 carbon atoms; and, heating the thus contacted inorganic hydrogel at an elevated temperature such that essentially all the liquid components contained therein are removed, wherein the amount of the at least one organosilicon compound employed in the contacting step is in the range of from about 0.1 to about 20 weight percent of the hydrogel employed.

18. A process according to claim 17 wherein R is selected from the group consisting of alkyl radicals of from 4 to about 12 carbon atoms, alicyclic radicals of from 4 to about 12 carbon atoms, aryl radicals of from 6 to about 24 carbon atoms, and hydrocarbyl-substituted aryl radicals such as alkylaryl and cycloalkylaryl of from 6 to about 24 carbon atoms.

19. A process according to claim 17 wherein said inorganic hydrogel is a hydrogel comprising silica.

20. A process according to claim 17 wherein said organosilicon compound is selected from the group consisting of tri-t-butylsilanol, tri-t-octylsilanol, tricyclohexylsilanol, triphenylsilanol, tribenzylsilanol, tri-1-naphthylsilanol, tri-4-phenanthrylsilanol, tri-o-tolylsilanol, tri-p-cumenylsilanol, tris(4-pentyl-1-naphthyl)silanol, tris(10-decyl-9-anthryl)silanol, tris(3-cycloheptylphenyl)silanol, tris(7-phenyl-1-naphthyl)silanol, diphenylsilanediol, di-1-naphthylsilanediol, dicyclododecylsilanediol, di-t-octylsilanediol, triphenylchlorosilane, tri-1-naphthylbromosilane, dicyclohexyldichlorosilane, diphenyldiethoxysilane, phenylcyclohexylsilanediol and diphenyl-t-butylchlorosilane.

21. A process according to claim 17 wherein the said organosilicon compound is triphenylsilanol.

22. A process according to claim 17 wherein the said organosilicon compound is diphenylsilanediol.

23. A process according to claim 17 wherein the said organosilicon compound is triphenylchlorosilane.

24. A process according to claim 17 wherein said organosilicon compound is employed in the range of from about 1 to about 10 weight percent of the hydrogel employed.

25. A process according to claim 17 wherein said resulting hydrogel composition is heated to a temperature within the range of about 20° to about 300° C.

26. A process according to claim 17 wherein there is additionally present in the said contacting system at least one water-soluble oxygen-containing organic liquid.

27. A process according to claim 26 wherein the said water-soluble oxygen-containing organic liquid is selected from the group consisting of methanol, ethanol, propanol, isopropanol, tertiary butanol, acetone, methyl ethyl ketone, di-ethyl ketone and 1,4-dioxane.

28. A process according to claim 27 wherein the weight ratio of said water-soluble oxygen-containing organic liquid to the organosilicon compound is in the range from about 100:1 to about 0.5:1.

29. A process according to claim 28 wherein the weight ratio of said water-soluble oxygen-containing organic liquid to the organosilicon compound is in the range from about 20:1 to about 1:1.

30. A process according to claim 17 wherein said inorganic xerogel has a pore volume of at least 1.75 cc.

31. A process according to claim 17 wherein said inorganic xerogel has a pore volume within a range of about 1.75 to about 2.20 cc.

* * * * *